United States Patent [19]

Müller

[11] 3,936,326

[45] Feb. 3, 1976

[54] SMOKELESS FLUXING AGENT FOR HOT-TINNING, HOT-GALVANIZING, AND HOT-LEADING OF ARTICLES MADE FROM IRON

[75] Inventor: Wolfgang Müller, Mannheim, Germany

[73] Assignee: Th. Goldschmidt AG, Germany

[22] Filed: Nov. 1, 1974

[21] Appl. No.: 520,139

[52] U.S. Cl. .................................... 148/26
[51] Int. Cl.² ........................................ B23K 35/34
[58] Field of Search ........................................ 148/26

[56] References Cited
UNITED STATES PATENTS

| | | | |
|---|---|---|---|
| 2,817,894 | 12/1957 | Steinberg | 148/26 |
| 3,031,346 | 4/1962 | Wasserman | 148/26 |
| 3,621,188 | 11/1971 | Joseph | 148/26 |
| 3,754,897 | 8/1973 | Derham | 148/26 |

*Primary Examiner*—Peter D. Rosenberg
*Attorney, Agent, or Firm*—James E. Bryan

[57] ABSTRACT

This invention relates to a smokeless fluxing agent for hot-tinning, hot-galvanizing, and hot-leading iron articles comprising a mixture of zinc chloride, potassium chloride, sodium chloride and lithium chloride, and containing no ammonium chloride.

5 Claims, No Drawings

SMOKELESS FLUXING AGENT FOR HOT-TINNING, HOT-GALVANIZING, AND HOT-LEADING OF ARTICLES MADE FROM IRON

Used as fluxing agents in hot-metallizing practice — irrespective of whether working is conducted according to the wet process or according to the dry process — are systems which contain essentially zinc chloride and ammonium chloride, or also ammonium chloride alone. In the wet process, stain-moist objects are dipped into the molten metal through a melt-liquid covering formed by the fluxing agent. In the dry process, the articles or objects are dipped into a fluxing agent solution, the fluxing agent is dried, and the objects are then dipped into the uncovered metal bath.

The use of ammonium chloride serves for obtaining a good after-staining effect during hot-metallizing. The ammonium chloride is largely dissociated to ammonia and hydrogen chloride at the temperatures employed. The ammonia combines with the zinc chloride present to form the known, very stable and low-viscosity compound zinc ammonium chloride. The hydrochloric acid effects the extremely strong re-dyeing.

However, at temperatures of 300° to 470°C, at which the metallizations are carried out, the component ammonium chloride has a very high vapor pressure and the sublimation temperature of ammonium chloride, which is approximately 350°C, is already exceeded. This has the adverse consequence that, at these elevated temperatures, excess ammonium chloride sublimates into the atmosphere as a white mist.

It is the object of the present invention to obtain the effect of the ammonium chloride by means of substances in which the economically adverse and environmentally harmful smoke development does not occur.

Surprisingly, a smokeless fluxing agent has been found which has an effective content of lithium chloride, and which fluxing agent is free of ammonium chloride. The function of the extremely good re-staining by the ammonium chloride is performed in this case by the lithium chloride.

A further embodiment of the smokeless fluxing agent according to the present invention contains a mixture of zinc chloride, potassium chloride, sodium chloride, lithium chloride, and, if desired, calcium chloride.

One advantage of this fluxing agent is that it boils off very well from the objects or articles to be metallized. In a preferred embodiment of the smokeless fluxing agent, use is made of a mixture of 65 to 85% by weight of zinc chloride, 10 to 35% by weight of potassium chloride and sodium chloride, 2 to 8% by weight of lithium chloride, and 0 to 6% by weight of calcium chloride.

For the purpose of reducing the melting temperature and the viscosity of the zinc chloride melts, it is particularly advantageous to utilize the potassium chloride and sodium chloride in the form of the eutectic mixture thereof. The eutectic mixture consists of 56 parts by weight of potassium chloride and 44 parts by weight of sodium chloride. In a preferred embodiment of the present invention, the lithium chloride is added to this eutectic mixture in an amount which corresponds to the potassium chloride-lithium chloride eutectic mixture. The potassium chloride-lithium chloride eutectic mixture consists of 55.7 parts by weight of potassium chloride and 44.3 parts by weight of lithium chloride. Accordingly, the ternary eutectic mixture has the following composition:

55.7 parts by weight of potassium chloride,
43.8 parts by weight of sodium chloride, and
44.3 parts by weight of lithium chloride.

The smokeless fluxing agent of the present invention may be used both in the form of a solution and also in the form of a melt.

The present invention will now be further described hereinafter on the basis of the following examples:

EXAMPLE 1

100 Parts by weight of a salt mixture of 75 parts by weight of zinc chloride, 20 parts by weight of potassium chloride/sodium chloride eutectic mixture, 4 parts by weight of lithium chloride, and 1 part by weight of calcium chloride are dissolved in 200 parts by weight of water. Obtained are 230 parts by volume of a solution having a density of 33°Be = $d_4^{15}$ = 1.295. Dipped into this solution are stained-moist iron objects, previously rinsed in water. The solution is then allowed to dry for 15 minutes at a temperature of 180°C. The metallization is performed in a zinc bath with approximately 1% by weight lead and 0.2% by weight aluminum. The fluxing agent boils off of the objects without perceptible smoke development. The objects are galvanized flawlessly.

EXAMPLE 2

A mixture of 83.7 parts by weight of zinc chloride, 11.3 parts by weight of sodium chloride/potassium chloride eutectic mixture, and 5.0 parts by weight of lithium chloride is melted down on a lead bath with a 2% by weight tin content, which was heated to 370°C. In this case, practically no smoke development occurs. Stain-moist iron parts may be leaded faultlessly through the fluxing agent melt covering.

It will be obvious to those skilled in the art that many modifications may be made within the scope of the present invention without departing from the spirit thereof, and the invention includes all such modifications.

What is claimed is:

1. A smokeless fluxing agent for hot-tinning, hot-galvanizing, and hot-leading iron articles comprising a mixture of zinc chloride, lithium chloride, an eutectic mixture of potassium chloride and sodium chloride, and containing no ammonium chloride.

2. A fluxing agent according to claim 1 including calcium chloride.

3. A fluxing agent according to claim 1 comprising a mixture of about 65 to 85% by weight of zinc chloride, about 10 to 35% by weight of an eutectic mixture of potassium chloride and sodium chloride, and about 2 to 8% by weight of lithium chloride.

4. A fluxing agent according to claim 3 including up to about 6% by weight of calcium chloride.

5. A fluxing agent according to claim 3 in which the lithium chloride is present in a quantity corresponding to that of the potassium chloride-lithium chloride eutectic mixture.

* * * * *